UNITED STATES PATENT OFFICE.

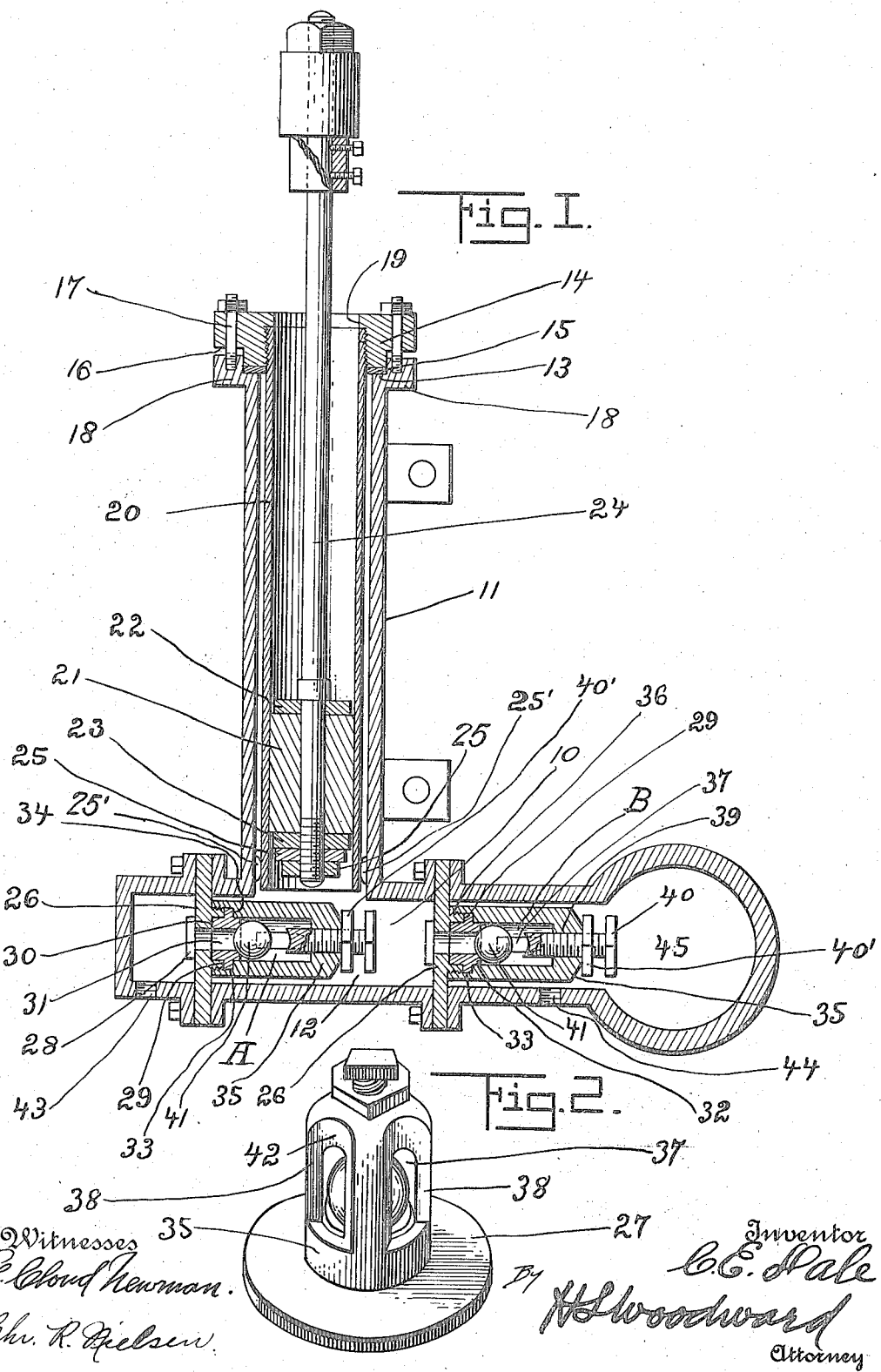

CHARLES E. DALE, OF CLEVELAND, OKLAHOMA.

PUMP APPLIANCE.

1,133,270. Specification of Letters Patent. Patented Mar. 30, 1915.

Application filed May 3, 1913. Serial No. 765,275.

*To all whom it may concern:*

Be it known that I, CHARLES E. DALE, a citizen of the United States, residing at Cleveland, in the county of Pawnee and State of Oklahoma, have invented new and useful Improvements in Pump Appliances, of which the following is a specification.

This invention relates to pumps and particularly to such as are suitable for use on oil wells to be operated by steam, and has for its object to provide a simplified construction whereby such may be produced at a low cost with increased economy and efficiency in operation.

It is an important object to provide construction to facilitate the renewal and adjustment of parts with facility.

Another object is to provide a conveniently applicable form of ball valve and casing, with means for adjusting the movement of the ball, so that there will be a minimum of lost motion with pumps of various speeds and capacities.

Additional objects and advantages will appear, some of them from the following description and from the drawings, in which—

Figure 1 is a sectional view of my pump construction, Fig. 2 is a detail of the valve.

There is illustrated a pump comprising a major T-shaped casting 10, the pump cylinder casing 11 being the major arm of the body, and leading into the force pipe 12, extending at right angles thereto. Fitted in opposite ends of the pipe 12 there are valves A and B, to be subsequently described, one opening inward and the other opening outward. The outer end of the casing 11 is enlarged and rabbeted on the inside to form the gland 13, in which there fits snugly the collar 14 compressing suitable packing 15. The collar is provided with a flange 16 through which bolts 17 are engaged with the corresponding flange or enlargement 18 of the casing.

It is a particular object of the invention to enable the use of very thin liners or casings on pumps, even where high pressure is involved, and to obviate the necessity for accurate machined fit between the liner and inclosing casing throughout the length of the liner.

The collar is formed with the flange or seat 19 at its outer end and is threaded throughout its inner portion from the seat, receiving the correspondingly threaded outer end of the cylinder liner 20. It will be noted that the inner part of the collar opening is of less diameter than the interior of the casing 11, so that the liner 20 is spaced from the surface of the casing, as shown, for a reason to be made apparent. Engaged in the liner there is a piston of any suitable form, that shown comprising a rubber or other compressible cylinder 21, compressed between the inner stationary and the outer movable collars 22 and 23 on the piston rod 24, and held by the usual nuts 25 on the extremity of the rod. The casing 11 and liner 20 both open clear into the pipe 12. The liner is of quite thin material, and may be formed by any of the simple processes possible with thin tubing. It is thus inexpensive and may be also made of very expensive metal without excessive cost. It becomes possible with this liner to renew the lining after but slight wear, as regards enlargement of the interior measurement of the liner, whereby the pump piston may be maintained at a high efficiency with a minimum packing adjustment. A cylinder may be used under this construction which would be insufficient in tensile strength to resist the pressure generated in the pump if unsupported, and will not be liable to distortion by local bulging. The space between the liner and the cylinder being open to the force pipe, there will always be pressure against the outside of the liner balancing the pressure from within. If desired a series of lugs 25' may be provided at the inner end of the casing 11 adapted to receive and guide the inner end of the sleeve to a central position in the casing. These lugs should engage only the sides of the liner, however, and not project over its end. In this way the liner may at all times be firmly held against movement in the casing, while yet permitting tightening of the gland as desired, and also variations of the sleeve from standard length will not prevent its proper fitting in the pump.

The valves A and B are both alike and interchangeable, so that a description of one will apply to the other. The valve comprises the base 26, having the flange 27 therearound adapted to be coengaged between the abutting flanges of two pipe sections, as shown, having an exterior boss 28 adapted to fit into one pipe, but being flattened on two sides or more, whereby a wrench may be engaged therewith for disassembling of the device. The base is provided on the opposite side with an exteriorly threaded boss 29 in which there is formed a concentric rabbet or seat 30 around the port 31 opening through the base. A seat bushing 32 is fitted snugly in this recess, having a flange 33 therearound projected over the end of the boss 29, to be engaged by a shoulder 34 of the cage 35, which has the interiorly threaded sleeve 36 projected outwardly of the shoulder for engagement on the boss 29, whereby the cage is held upon the base and the seat bushing secured firmly in place. The bushing projects through the sleeve and stops adjacent the inner end of the sleeve. The cage is practically a continuation of the sleeve, with a number of ports 37 cut therethrough extending longitudinally a proper distance, forming therebetween arms 38 which carry at their outer ends the centrally apertured and threaded head 39, through which there is engaged the screw 40 having a spherical socket on its inner end conforming to the shape of the ball 41 disposed within the cage and adapted to seat on the bushing 32. A lock nut 40' is engaged with the screw. The head is provided with recesses or channels 42 extending longitudinally thereof and leading from the ports 37 whereby a maximum clearance is given when the device is presented in a close fitting pipe. The cage is preferably of slightly less diameter than the boss 28.

An intake fitting 43 is secured outwardly of the valve A, while a delivery pipe fitting 44 is engaged outwardly of the valve B, and this may embody an air chamber 45 if desired.

It will be seen that simple and efficient means are provided for renewing and adjusting the elements of my pump, and the form of the valves is particularly desirable, as the play of the balls may be adjusted to accord properly with the capacity or speed of the pump, and the operation in the way for which it is set may be maintained regardless of wear of the seat, ball, and the screw 40, the latter being simply screwed farther in when the amount of play of the ball is excessive.

The body casting for my invention is extremely simple and requires but little machining.

What is claimed is:

1. A pump comprising a hollow T-shaped casting, including a cylinder casing and a force pipe, a removable collar fixed on the outer end of the casing a liner carried thereby and spaced within the casing, the ends of the casing and liner opening clear toward the force pipe, a piston in the liner, and inlet and outlet valves in the force pipe.

2. A pump comprising a hollow casting including a pressure chamber and a cylindrical casing opening clear into the chamber, the outer end of the casing being enlarged and having packing accommodations, a packing therein, a collar engaging with the packing in the end of the casing, means for securing the collar to the casing, the interior of the collar being threaded, a liner having one end threaded and engaged in the collar and positioned concentrically in the casing, said liner being of less external diameter than the interior diameter of the casing, whereby a space is formed therebetween in free communication with the pressure space, a piston in the liner, and inlet and outlet valves in the force space.

3. In a pump of the class described a cylinder casing, a removable collar fixed at the outer end of the casing, a liner carried by the collar and spaced within the casing, slidably for removal with said collar, and a plurality of lugs formed on the casing adjacent the end of said liner.

In testimony whereof I have hereunto set my hand in presence of two subscribing witnesses.

CHARLES E. DALE.

Witnesses:
R. A. Delo,
Jno. F. Algeo.